US011473611B2

(12) United States Patent
Stewart (10) Patent No.: US 11,473,611 B2
(45) Date of Patent: Oct. 18, 2022

(54) NUT LOCKING SYSTEM WITH DIFFERENT THREADS SHARING SAME PITCH

(71) Applicant: Keith Stewart, Inman, SC (US)

(72) Inventor: Keith Stewart, Inman, SC (US)

(*) Notice: Subject to any disclaimer, the term of this patent is extended or adjusted under 35 U.S.C. 154(b) by 316 days.

(21) Appl. No.: 16/905,712

(22) Filed: Jun. 18, 2020

(65) Prior Publication Data

US 2021/0396267 A1 Dec. 23, 2021

(51) Int. Cl.
*F16B 39/30* (2006.01)
*B23G 1/32* (2006.01)

(52) U.S. Cl.
CPC ............... *F16B 39/30* (2013.01); *B23G 1/32* (2013.01)

(58) Field of Classification Search
CPC .......... F16B 39/30; F16B 39/28; F16B 39/22; F16B 39/02; B23G 1/32; B23G 1/00; B23G 1/34
USPC ........................................................ 411/263
See application file for complete search history.

(56) References Cited

U.S. PATENT DOCUMENTS

| | | | |
|---|---|---|---|
| 1,467,824 A | 9/1923 | Ahlers | |
| 1,473,321 A * | 11/1923 | Rumfelt | F16B 39/36 411/223 |
| 4,364,136 A | 12/1982 | Hattan | |
| 4,396,321 A * | 8/1983 | Holmes | B23G 5/06 408/217 |
| 4,909,689 A | 3/1990 | Komatsu | |
| 5,154,560 A | 10/1992 | Copito | |
| 5,544,991 A * | 8/1996 | Richardson | F16B 39/12 411/932 |
| 5,623,863 A | 4/1997 | Plantan | |
| 5,855,463 A | 1/1999 | Newby | |
| 9,950,380 B1 * | 4/2018 | Doll | B24B 3/602 |
| 2018/0051737 A1 * | 2/2018 | Budziszek | F16B 39/284 |

FOREIGN PATENT DOCUMENTS

GB 158878 A 11/1921
GB 181492 A 6/1922

* cited by examiner

*Primary Examiner* — Mark R Wendell (74) *Attorney, Agent, or Firm* — Thrive IP (57) ABSTRACT

A locking nut system includes a threaded member with a first threaded area having a first thread direction and a second threaded area having a second thread direction opposite the first thread direction in which a plurality of crests extend across the first and second threaded areas with a constant pitch between the crests such that minimal material is removed, structural integrity is maintained, and a first nut secures the threaded member to a workpiece and a second opposing nut renders the first nut stationary.

17 Claims, 7 Drawing Sheets

NUT LOCKING SYSTEM WITH DIFFERENT THREADS SHARING SAME PITCH

BACKGROUND OF THE DISCLOSURE

Locking nuts or "lock nuts" are used with threaded objects such as a bolt to prevent a nut from "walking off" the bolt due to vibration or jarring. Attempts have been made to use adhesives, Cotter pins, and/or to utilize two or more nuts on the threaded member to lock the nuts to the member. However, adhesives are messy and become brittle and fail over time. And known arrangements are either mechanically complex or use different threaded areas that fail because they do not use the same pitch between threads. For instance, in a conventional arrangement where a first portion of a threaded object has a first pitch and a second portion has a second different pitch, as much as 55% of thread material can be stripped away when the second portion is formed over the first portion. Excessive material removal weakens the contact area between the threaded object and the nut and negatively affects the ability of a lock nut to remain in place when jarring or stresses are applied to the connection, particularly in an environment subject to continuous vibrations. Nuts engaged with less than 50% of the original thread material inexorably loosen, the nuts separate from the threaded member, and the connection fails.

What is needed is a system for securing a nut to a threaded member in a manner that resists jarring and vibrations that loosen the nut.

BRIEF SUMMARY OF THE DISCLOSURE

The present disclosure is directed in general to a nut locking system that utilizes two or more threaded areas on a threaded object in which the threaded areas having opposing directions but employ the same pitch or spacing between crests of each thread with minimal material removed on a hybrid threaded area. The nut locking system is simple to make, easy to use, and reliable and can be used in a variety of applications using different materials, shapes, and sizes.

In one embodiment according to the disclosure, a locking nut system may include a threaded member having a proximal end, a body, and a distal end. The body may have a first threaded area defining a first thread direction and a second threaded area defining a second thread direction differing from the first thread direction but not incompatible therewith. The first and second threaded areas have threads with crests with a constant pitch between crests. The threaded member can be inserted through a workpiece to receive a first nut along the second threaded area and onto the first threaded area to secure the workpiece between the proximal end and the distal end. The threaded member can also receive a second nut onto the second threaded area such that the second nut stabilizes the first nut against vibrations. In this embodiment, the threaded member can be a bolt or a screw, and its proximal end is a head. However, the threaded member can also be an axle or rod with dual-threaded areas on either end that receive locking nuts to retain opposing nuts in place as the axle rotates.

Also, in this aspect the first thread direction can be a right-hand direction and the second thread direction includes a left-hand direction. Alternatively, the first thread direction can be a left-hand direction and the second thread direction includes a right-hand direction.

The locking nut system in this embodiment may include the first nut with internal threads that complement the first thread direction of the first threaded area. In this embodiment, the second threaded area can be machined over a portion of the first threaded area in the proximity of the distal end. The first nut will have internal threads complementary to the second thread direction of the second threaded area such that the first nut can be threaded over the second threaded area to reach the first threaded area. The locking nut system may also include the second nut with internal threads that complement the second thread direction of the second threaded area such that the second nut can be threaded over the second threaded area.

In this embodiment, after machining the second threaded area over a portion of the first threaded area of the locking nut system, the second threaded area will retain at least 50% of material from the portion of the first threaded area such that the first nut can be threaded over the second threaded area to reach the first threaded area. More particularly, after machining the second threaded area over the portion of the first threaded area, the second threaded area can retain about 75% to about 87% of material from the portion of the first threaded area, and the first nut can be threaded over the second threaded area to reach the first threaded area.

In a further embodiment of the disclosure, a locking nut system can include a threaded member having a first threaded area defining a first thread direction and a second threaded area having a second thread direction different from the first thread direction but not conflicting therewith; a plurality of crests formed along the first and second threaded areas, a constant pitch being defined between crests; a first nut having a first set of internal threads complementary to the first thread direction of the first threaded area, the second threaded area configured to permit passage of the first nut to the first threaded area; a second nut having a second set of internal threads complementary to the second thread direction of the second threaded area, and the threaded member can be inserted through a workpiece to receive the first nut over the second threaded area and onto the first threaded area to secure the first nut against the workpiece. The threaded member can also receive the second nut over the second threaded area to secure the first nut. The threaded member can be a bolt or a screw, and the first thread direction is a right-hand direction and the second thread direction includes a left-hand direction. Alternatively, the first thread direction can be a left-hand direction and the second thread direction includes a right-hand direction.

In this embodiment, the second threaded area of the locking nut system can be overlaid on a portion of the first threaded area such that the second threaded area retains about 75% to about 87% of material from the portion of the first threaded area and permits the first nut to be threaded over both the first and second threaded areas. The second nut may be threaded over the second threaded area but threaded onto the first threaded area.

In a further embodiment, a method of manufacturing a locking nut system may include the steps of providing a member for machining; machining a first threaded area with a first thread direction; machining a second threaded area over a portion of the first threaded area, the second threaded area defining a second thread direction opposite the first thread direction, the second threaded area having both first and second thread directions; and forming a plurality of thread crests along the first and second threaded areas with a constant pitch between the thread crests. Also, a first nut having a first set of internal threads complementary to the first thread direction of the first threaded area and a second nut having a second set of internal threads complementary to the second thread direction of the second threaded area can be provided.

The method can further include inserting the threaded member through a workpiece to receive the first nut over the second threaded area and onto the first threaded area to secure the first nut against the workpiece, and the threaded member can receive the second nut over the second threaded area to secure the first nut. Still further, when the second threaded area is machined over a portion of the first threaded area, the second threaded area will retain from about 75% to about 87% of material from the portion of the first threaded area, and a nut having internal threads complementary to the first threaded area can be threaded along the second threaded area and the first threaded area. The first nut can be connected over the first and second threaded areas, and the second nut is configured for connection over the second threaded area.

Also according to this exemplary method, when the member is inserted in a workpiece and secured by at least a first nut having internal threads complementary to the first thread direction and a second nut having internal threads complementary to the second thread direction and a vibration acts upon the member and the first and second nuts, the second nut will oppose the vibration to secure the first nut to the workpiece. More particularly, when the member is inserted in a workpiece and secured by at least a first nut having internal threads complementary to the first thread direction and a second nut having internal threads complementary to the second thread direction and a loosening vibration acts upon the first nut, the second nut will be unaffected by the vibration thereby securing the first nut to the workpiece.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

As required, detailed embodiments are disclosed herein; however, the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Wherever the phrase "for example," "such as," "including," and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etcetera. Thus, for example, "a device having components a, b, and c" means that the device includes at least components a, b, and c. Similarly, the phrase: "a method involving steps a, b, and c" means that the method includes at least steps a, b, and c.

Where a list of alternative component terms is used, e.g., "a structure such as 'a', 'c', 'd' or the like", or "a" or b", such lists and alternative terms provide meaning and context for the sake of illustration, unless indicated otherwise. Also, relative terms such as "first," "second," "third," "front," and "rear" are intended to identify or distinguish one component or feature from another similar component or feature, unless indicated otherwise herein.

Unless the context clearly requires otherwise, throughout the description and the claims, the words "comprise", "comprising", and the like are to be construed in an inclusive sense as opposed to an exclusive or exhaustive sense; in the sense of "including, but not limited to".

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Figure 1:
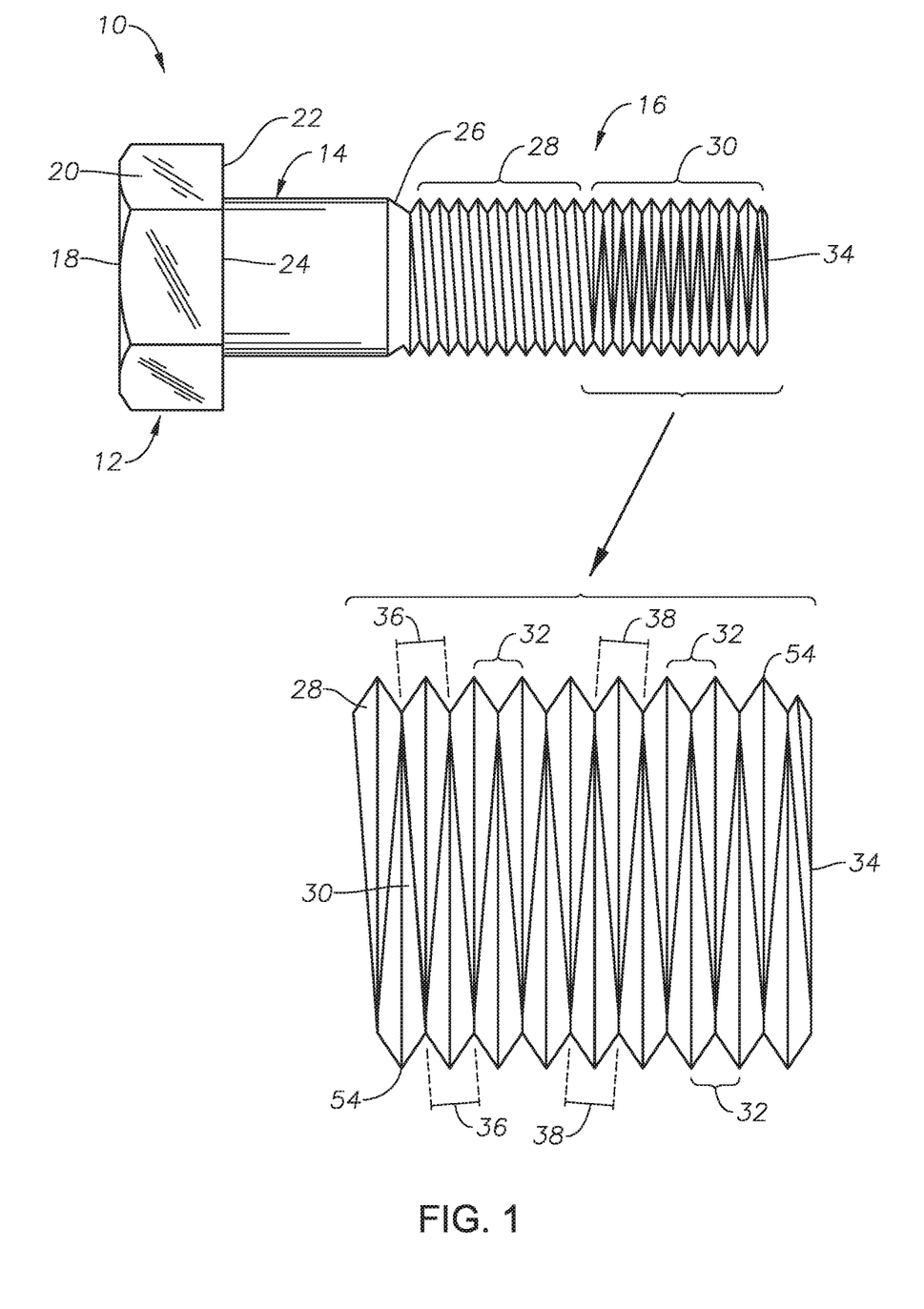
FIG. 1 is a side elevational view of an embodiment of a dual threaded member according to the disclosure, including an enlarged inset of a hybrid threaded area.

Turning now to FIG. 1, an exemplary nut locking system according to the disclosure includes a threaded member designated broadly by the element number 10. The exemplary member 10 may be a bolt, a screw, a rod, or any member requiring threads for nuts. Here, the member is a bolt 10 that includes a proximal end or head 12, a neck or shank 14, and a threaded shaft or body 16. The head 12 may include a top or crown 18 with drive surfaces or facets 20, and a shoulder 22. The shank 14 has a first or head end 24 and a second or thread end 26, which may be chamfered as it transitions into the threaded body 16. Here, the threaded body 16 includes a first threaded area or section of threads 28, a second threaded area or section of threads 30, and a distal end 34. The bolt 10 and related components may be made of metal such as steel, titanium, or brass but any material suitable for connecting components may be utilized.

As shown most clearly in the enlarged inset of FIG. 1, the threaded area 30 includes overlaid left-handed threads 38 as well as right-handed threads 36 that continue into section 28. In effect, the area 30 is a hybrid threaded section with right-handed threads 36 and left-handed threads 38 superimposed over the right-handed threads 36. Each thread has a crest 54, and a pitch 32 is constant between each crest 54 in both the first threaded section 28 and the second threaded section 30. The disclosure is not limited to this example as the directions could be reversed, such that the first threaded section 28 could have a left-handed thread arrangement and the second threaded section 30 could have a right-handed thread arrangement. Also, in this embodiment the left-handed threaded section 30 chases the right-handed threaded section 28 approximately one half of the distance of the entire threaded body 16. This arrangement retains optimum structural integrity and permits full thread contact by a right-hand nut while permitting a left-hand or locking nut also to be utilized to create a vibration proof system, as explained in greater detail below. Still further, although only two sections 28, 30 are shown by example, the body 16 could include additional threaded sections as necessary, presumably if the body 16 is sufficiently long and is needed to connect to more than one workpiece.

Figure 2:
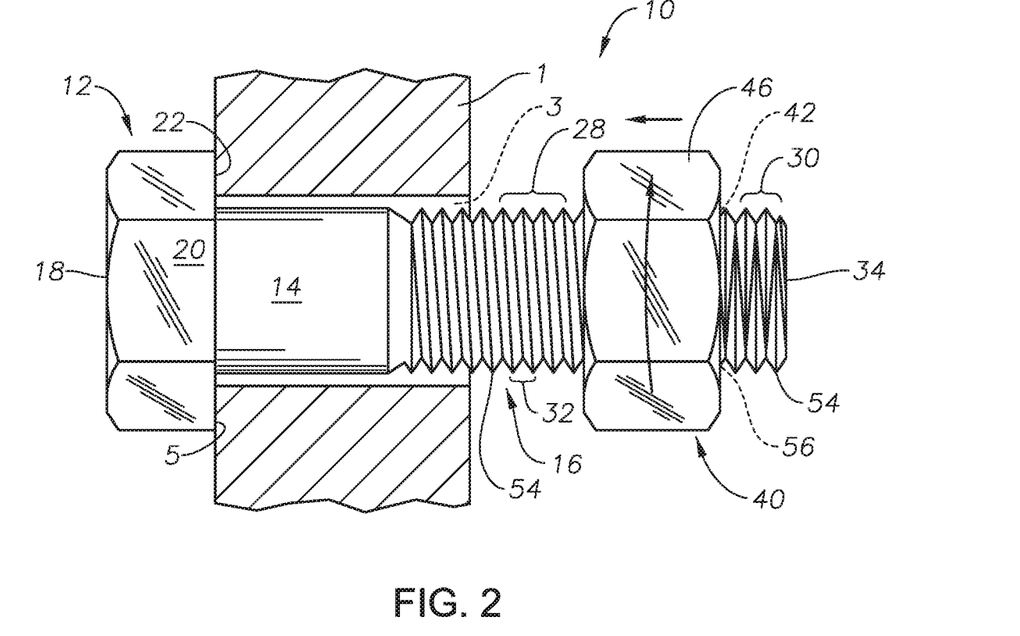
FIG. 2 is a partial sectional view of the embodiment in FIG. 1 in an intended use environment, particularly showing a nut being screwed onto the dual threaded member in a first direction.

FIG. 2 shows a partial cross section of a workpiece 1 in which the bolt 10 introduced in FIG. 1 has been inserted into a hole or aperture 3 of the workpiece 1. Here, the shank 14 is positioned in the aperture 3, and the shoulder 22 is pressed against a first surface 5 of the workpiece 1. Although not shown, a wrench, screwdriver, or other appropriate tool can be used to render the head 12 stationary while a right-hand nut 40 is threaded onto the body 16 from the end 34. For instance, a socket wrench can be used against the facets 20 to prevent the bolt 10 from turning as the nut 40 is attached in a direction of the workpiece 1, as indicated by the directional arrows.

As further shown in FIG. 2, the nut 40 has facets or drive surfaces 46 engageable with a socket wrench or the like (not shown). The nut 40 includes a threaded opening or aperture 42 to receive the end 34, and the drive surfaces 46 will be used to turn the nut 40 onto the body 16. As introduced in FIG. 1, the same pitch 32 is found between the crests 54, and right-handed threads 56 of the nut 40 will have the same pitch and direction to complement the right-handed threads 36 found in both sections 28, 30 of the threaded body 16. More particularly, the right-handed threads 56 of the nut 40 will engage the right-handed threads 36 to thread or screw the nut 40 onto the body 16. See also FIGS. 5, 6 and 7.

Figure 3:
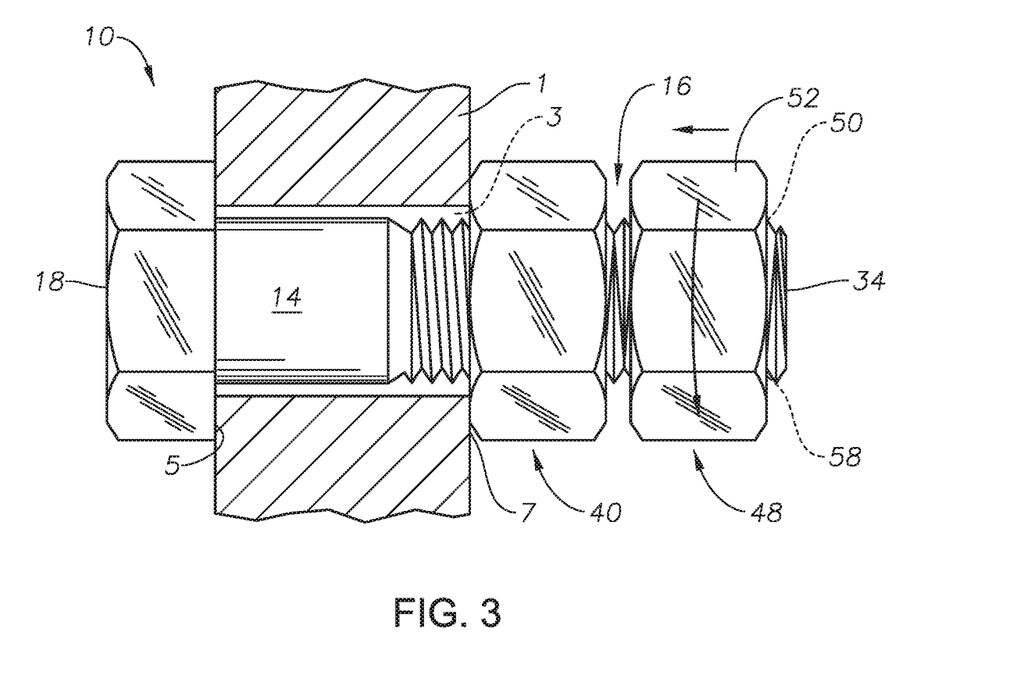
FIG. 3 shows the embodiment as in FIG. 2, particularly showing a second nut being screwed onto the dual threaded member in a second direction.

Turning now to FIG. 3, the bolt 10 is shown urged against the surface 5 of the workpiece 1 with the shank 14 situated within the aperture 3. As shown, the nut 40 has been screwed onto the body 16 until the nut 40 is pressed to a desired torque against the surface 7 of the workpiece 1. Next, a second locking or "jam" nut 48 is threaded onto the body 16 from the end 34. Here, the nut 48 includes facets or drive surfaces 52 engageable by a wrench (not shown) to turn the nut 48 in a left-handed direction as indicated by the directional arrows. More particularly, the locking nut 48 includes an aperture 50 with left-hand oriented threads 58 (see, e.g., FIG. 7) that mate with the left-handed threads 38 of section 30. The left-handed threads 38, 58 share the same pitch and direction and are therefore complementary to each other. Advancement of the nut 48 should end once its threads 58 reach the right-hand oriented threads 56 of the first section 28, which does not contain left-hand oriented threads like the hybrid section 30.

Figure 4:
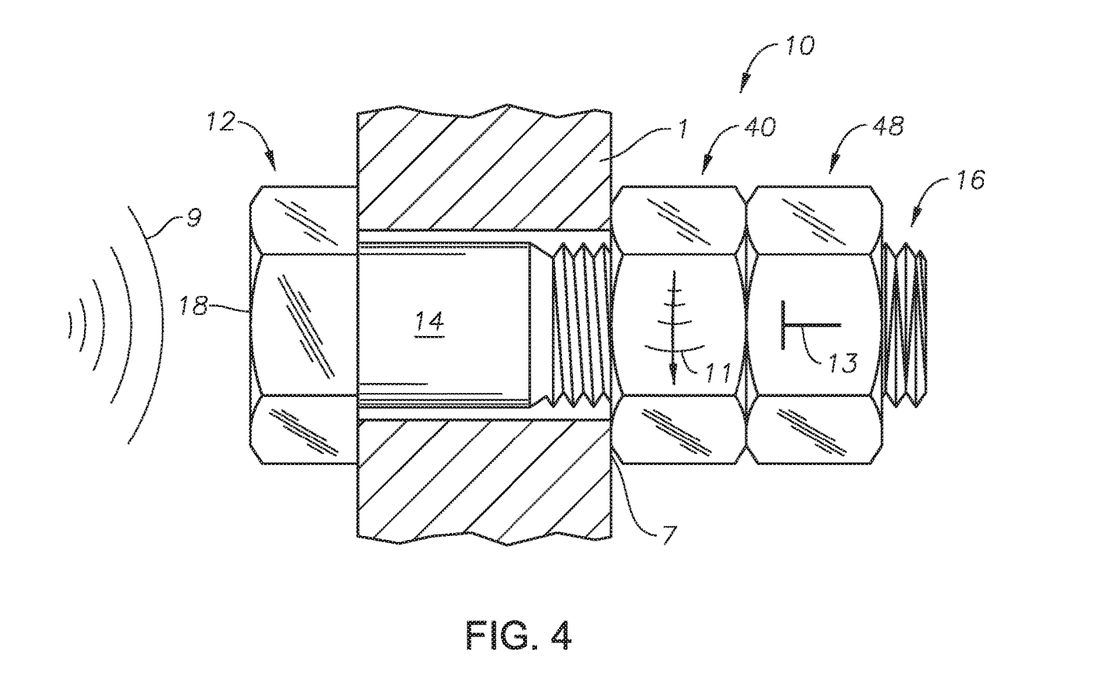
FIG. 4 schematically shows a sympathetic vibration acting upon the embodiment as in FIG. 3 in which the second nut remains locked.

FIG. 4 shows components of the system 10 in operation. Here, the head 12 and its top 18, the shank 14, and the body 16 are in a fixed position relative to the workpiece 1. The first nut 40 and the locking nut 48 have been opposingly threaded along the body 16 until the nut 40 is tightened against the workpiece surface 7, and the locking nut 48 is pressed against the nut 40. When jarring or vibrations—schematically indicated by element number 9—act on the bolt 10 and the nuts 40, 48, the opposing threads function to prevent loosening and detachment of the bolt 10. More particularly, if the outside force or vibration 9 creates a sympathetic vibration 11 in or upon the nut 40 that would normally cause the nut 40 to loosen and "walk off" the body 16, the locking nut 48, being threaded in an opposite direction, will be unaffected by the vibration 9 and will remain stationary, as schematically indicated by element number 13. If the vibration 9 acts in an opposite manner, the locking nut 48 will oppose the vibration 9 since the locking nut 48 will be urged in an opposite direction; thus, the first nut 40 will remain stationary in either case.

Figure 5:
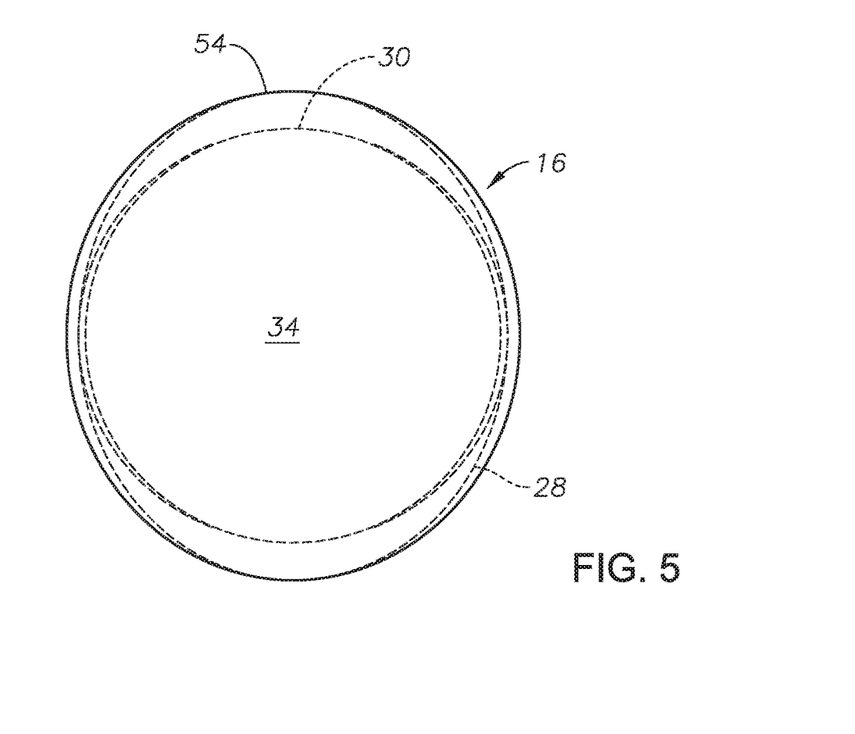
FIG. 5 is an end view of the exemplary member as in FIG. 1 showing the dual thread arrangements and crests in phantom.
Figure 6:
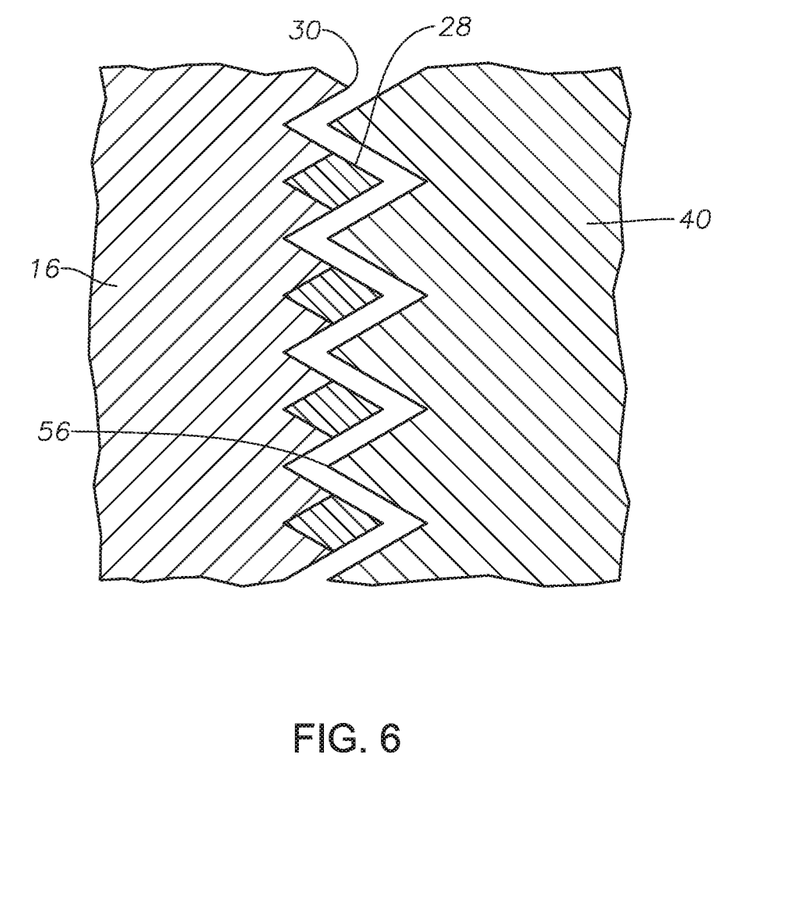
FIG. 6 is a partial, sectional, and exploded view of the member and nut as in FIG. 2, particularly showing the crests of the dual threads in the hybrid threaded area.

As more particularly shown in FIG. 5 from the end 34 of the body 16, although the threads 28 are oriented in a right-hand direction and the after-imposed threads 30 are left-handed 28, the pitch 32 (see FIG. 1) between crests 54 of all threads remains constant. Again, the direction of the threads in the sections 28, 30 can be reversed but the pitch 32 will remain constant such that the nut 40, as shown in FIG. 6, will engage both sections 28, 30. FIG. 6 again shows that the sections 28, 30 have opposite directions, but the pitch is the same, which permits the nut 40 to screw onto both sections 28, 30 while minimizing material removal when section 30 is overlaid to maximize structural integrity.

Figure 7:
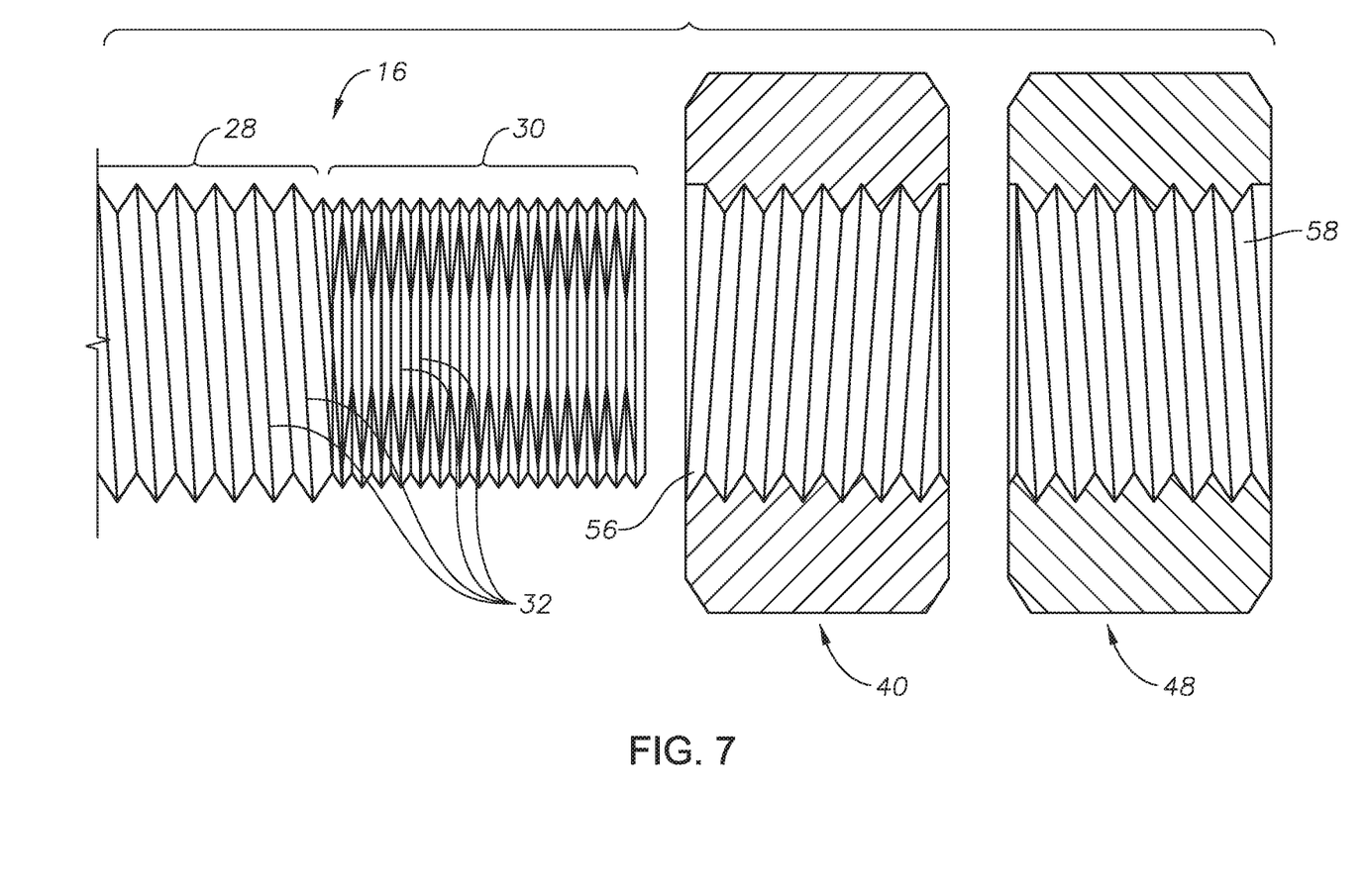
FIG. 7 is a partial side elevational view of the embodiment as in FIG. 3 with nut components exploded for clarity and shown in cross section.

FIG. 7 shows threaded areas 28 and 30 such as in FIG. 1 rotated 90 degrees along a major axis of the threaded portion 16. Here, the right-hand oriented thread area 28 can be most clearly contrasted with the left-hand oriented thread area 30. In this perspective of the body 16, which could be a portion of a rod, a screw, an axle, a bolt, or the like, the pitch 32 remains constant along threaded area 28 through threaded area 30. Compare FIGS. 1 and 5. Again, the constant pitch 32 ensures that the nut 40 can be threaded along area 30 onto threaded area 28; i.e., the threaded area 30 is machined to permit passage of the nut 40 to the first threaded area 28, but the nut 48, being machined in only one-direction, can only be threaded along the dual-threaded area 30 until it meets or abuts the oppositely threaded area 28.

Figure 8A:
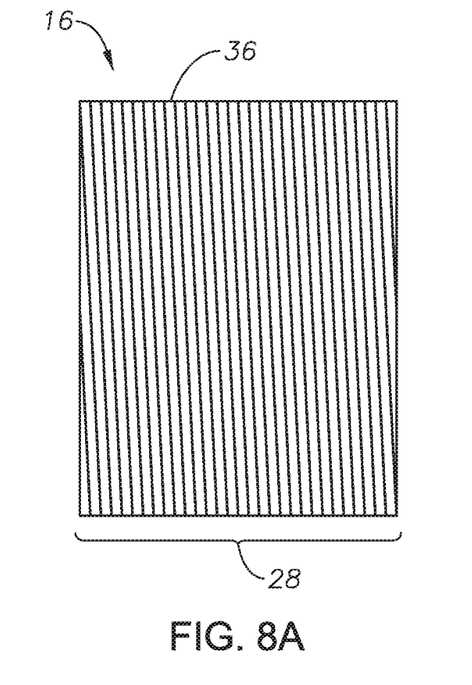
FIG. 8A is a plan view of a flattened or rolled out thread form of a threaded member as in FIG. 1.
Figure 8B:
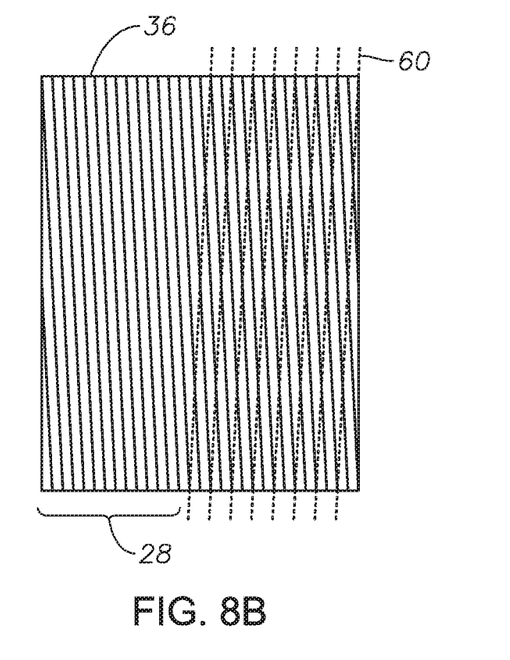
FIG. 8B is a plan view of the flattened thread form as in FIG. 8A wherein an opposing thread form is to be overlaid as shown in dashed lines.
Figure 8C:
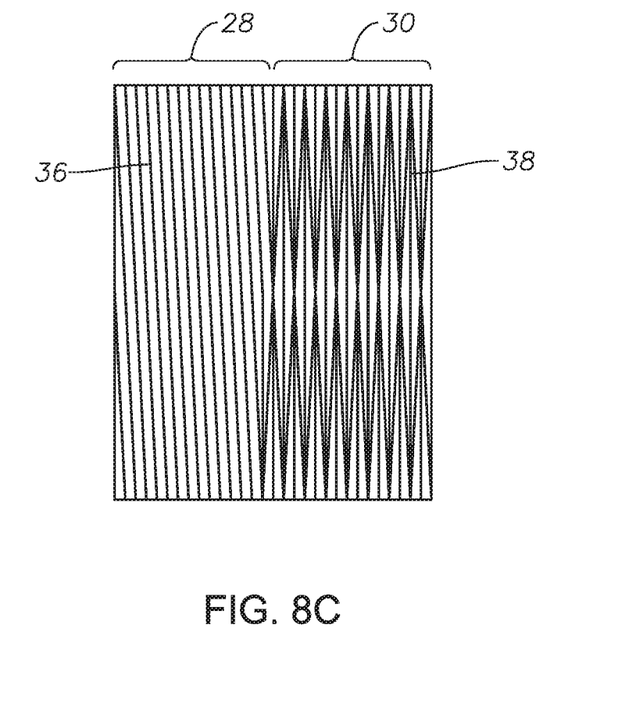
FIG. 8C is a plan view of the flattened thread form as in FIG. 8B wherein, after machining, the threaded member has an original thread form and an overlaid opposing thread form as in the embodiment of FIG. 1.

FIGS. 8A, 8B, and 8C show a formation of the exemplary threaded sections 28, 30 on the body 16. More particularly, FIGS. 8A-C show the thread forms rolled out or flattened as if unrolling a cylinder into a plan view. As shown, FIG. 8A is the first thread form 28 with right-handed threads 36 in this example. FIG. 8B shows dotted lines 60 to indicate the planned addition of a left-hand thread form to be machined over the right-handed threads 36. FIG. 8C shows the dual threaded body 16 with right-handed threads 36 in section 28 and left-handed threads 38 in hybrid section 30 after machining, or more particularly, a set of hybrid threads 38 with which both right-threaded and left-threaded nuts can be used.

FIG. 8C particularly shows that in a ½-13 TPI threaded member (i.e., a ½ inch member with 13 turns per inch), for example, approximately eighty-seven percent (87%) of the material will remain from the original right-handed threads 36 in the hybrid threads 38 when of machined to the same pitch. This not only allows a right-handed nut to be threaded over both the right-handed threads 36 and the hybrid threads 38 but maximizes the structural integrity of the body 16. Stated another way, if one pitch is used for a first thread form but a different pitch is used for a second thread form, too much material would be removed in the hybrid threads 38, which would compromise structural integrity and lead to failure and detachment of a nut from the hybrid threads 38. By way of further example, a ½-5 TPI threaded member would retain approximately seventy-five percent (75%) of its material when an opposite thread form is machined over the original threads using the same pitch.

Figure 9:
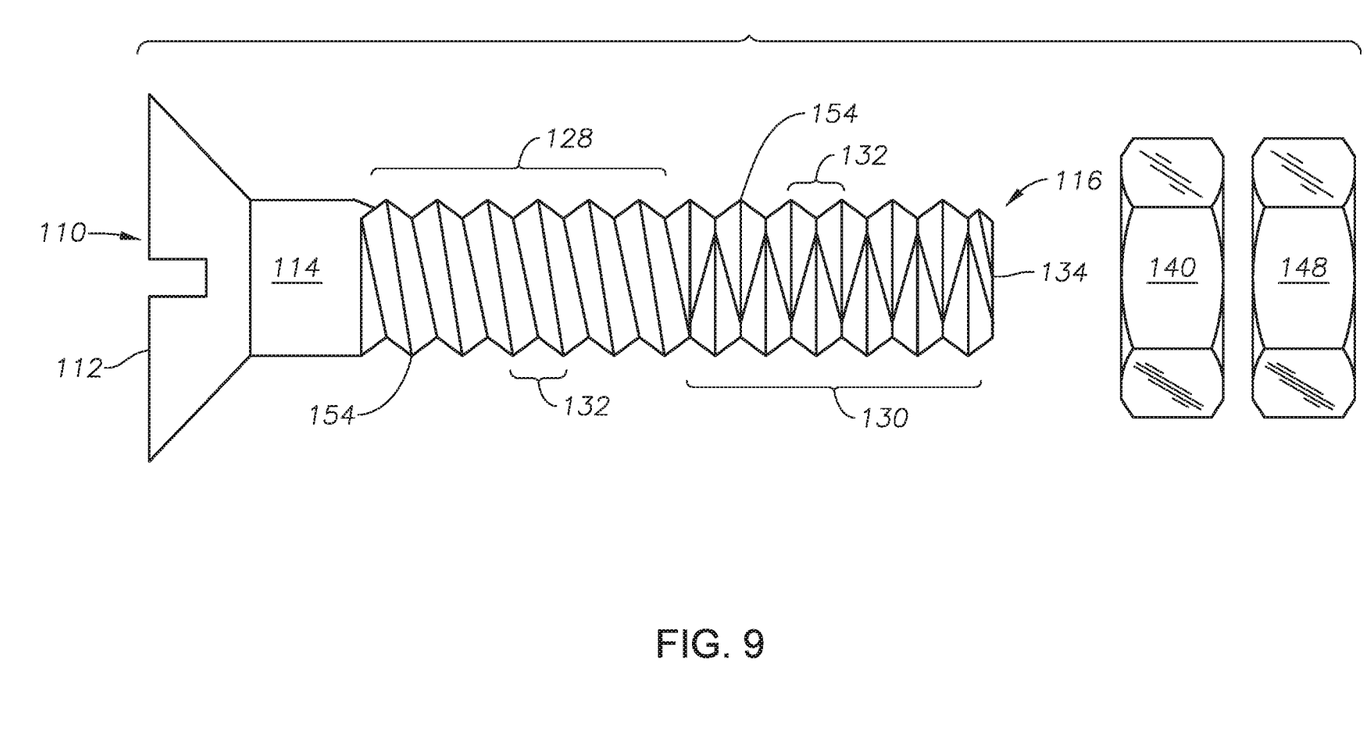
FIG. 9 is a side elevational, exploded view of another embodiment of a dual threaded member and nuts.

Turning to FIG. 9, another locking nut system 110 is shown with a head 112, a shank 114, and a threaded body 116. In this example, the head 112 may be used with a screwdriver (not shown), but a pitch 132 between crests 154 is constant along both a right-handed threaded section 128 and a left-handed or hybrid threaded section 130, which terminates at a tip 134. Also, in this exemplary embodiment the thread count is smaller than the foregoing examples. Still further, the directions of the threaded sections 128, 130 may be reversed to accommodate particular user requirements. Whether thread counts are smaller or larger or thread directions reversed, as long as the pitch 132 is constant along the threaded sections 128, 132, a nut 140 used at section 128 will be locked in by an opposing nut 148 threaded onto section 132 from the distal end 134.

By way of example and not of limitation, some exemplary embodiments as disclosed herein include but are not limited to:

Embodiment 1

A locking nut system comprising a threaded member having a proximal end, a body, and a distal end, the body including a first threaded area having a first thread direction and a second threaded area having a second thread direction differing from the first thread direction but not incompatible therewith, the first and second threaded areas defining a plurality of crests with a constant pitch between crests, wherein the threaded member is configured for insertion through a workpiece to receive a first nut along the second threaded area and onto the first threaded area to secure the workpiece between the proximal end and the distal end, and further configured to receive a second nut onto the second threaded area, the second nut being configured to stabilize the first nut against vibrations.

Embodiment 2

The locking nut system as in embodiment 1, wherein the first thread direction is a right-hand direction and the second thread direction includes a left-hand direction or the first thread direction is a left-hand direction and the second thread direction includes a right-hand direction.

Embodiment 3

The locking nut system as in embodiments 1 or 2, further comprising the first nut, the first nut having internal threads complementary to the first thread direction of the first threaded area, the second threaded area being machined over a portion of the first threaded area proximate the distal end, the first nut having internal threads complementary to the second thread direction of the second threaded area such that the first nut can be threaded over the second threaded area to reach the first threaded area.

Embodiment 4

A locking nut system as in any of the foregoing embodiments, further comprising the second nut, the second nut having internal threads complementary to the second thread direction of the second threaded area such that the second nut can be threaded over the second threaded area.

Embodiment 5

A locking nut system as in any of the foregoing embodiments, wherein, after machining the second threaded area over the portion of the first threaded area, the second threaded area retains at least 50% of material, more particularly, about 75% to about 87%, from the portion of the first threaded area such that the first nut can be threaded over the second threaded area to reach the first threaded area.

Embodiment 6

A locking nut system comprising a threaded member having a first threaded area defining a first thread direction and a second threaded area having a second thread direction different from the first thread direction but not conflicting therewith; a plurality of crests formed along the first and second threaded areas, a constant pitch being defined between crests; a first nut having a first set of internal threads complementary to the first thread direction of the first threaded area, the second threaded area configured to permit passage of the first nut to the first threaded area; a second nut having a second set of internal threads complementary to the second thread direction of the second threaded area; and wherein the threaded member is configured for insertion through a workpiece to receive the first nut over the second threaded area and onto the first threaded area to secure the first nut against the workpiece and is further configured to receive the second nut over the second threaded area to secure the first nut.

Embodiment 7

The locking nut system as in embodiment 6, wherein the first thread direction is a right-hand direction and the second thread direction includes a left-hand direction, or the first thread direction is a left-hand direction and the second thread direction includes a right-hand direction.

Embodiment 8

The locking nut system as in embodiments 6 or 7, wherein the second threaded area is overlaid on a portion of the first threaded area such that the second threaded area retains about 75% to about 87% of material from the portion of the first threaded area and permits the first nut to be threaded over both the first and second threaded areas.

Embodiment 9

The locking nut system as in embodiments 6, 7, or 8, wherein the second nut is configured to be threaded over the second threaded area but cannot be threaded onto the first threaded area.

Embodiment 10

The locking nut system as in any of the foregoing embodiments, wherein the threaded member is a bolt, a screw, or an axle.

Embodiment 11

The method of manufacturing a locking nut system comprising providing a member for machining; machining a first threaded area with a first thread direction; machining a second threaded area over a portion of the first threaded area, the second threaded area defining a second thread direction opposite the first thread direction, the second threaded area having both first and second thread directions; and forming a plurality of thread crests along the first and second threaded areas with a constant pitch between the thread crests.

Embodiment 12

The method as in embodiment 11, further comprising providing a first nut having a first set of internal threads complementary to the first thread direction of the first threaded area; and providing a second nut having a second set of internal threads complementary to the second thread direction of the second threaded area.

Embodiment 13

The method as in embodiment 11 or 12, further comprising inserting the threaded member through a workpiece to receive the first nut over the second threaded area and onto the first threaded area to secure the first nut against the workpiece, and further configured to receive the second nut over the second threaded area to secure the first nut.

Embodiment 14

The method as in embodiments 11, 12, or 13, wherein, when the second threaded area is machined over a portion of the first threaded area, the second threaded area retains from about 75% to about 87% of material from the portion of the first threaded area, and a nut having internal threads complementary to the first threaded area can be threaded along the second threaded area and the first threaded area.

Embodiment 15

The method as in embodiments 11 through 14, wherein the first nut is configured for connection over the first and second threaded areas, and the second nut is configured for connection over the second threaded area.

Embodiment 16

The method as in embodiments 11 through 15, wherein, when the member is inserted in a workpiece and secured by at least a first nut having internal threads complementary to the first thread direction and a second nut having internal threads complementary to the second thread direction and a vibration acts upon the member and the first and second nuts, the second nut is configured to oppose the vibration to secure the first nut to the workpiece.

Embodiment 17

The method as in embodiments 11 through 16, wherein, when the member is inserted in a workpiece and secured by at least a first nut having internal threads complementary to the first thread direction and a second nut having internal threads complementary to the second thread direction and a loosening vibration acts upon the first nut, the second nut is unaffected by the vibration thereby securing the first nut to the workpiece.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A locking nut system, comprising:
   a threaded member having a proximal end, a body, and a distal end, the body including a first threaded area having a first thread direction and a second threaded area having a second thread direction differing from the first thread direction but not incompatible therewith, the first and second threaded areas defining a plurality of crests with a constant pitch between crests, wherein the threaded member is configured for insertion through a workpiece to receive a first nut along the second threaded area and onto the first threaded area to secure the workpiece between the proximal end and the distal end, and further configured to receive a second nut onto the second threaded area, the second nut being configured to stabilize the first nut against vibrations; and the first nut having internal threads complementary to the first thread direction of the first threaded area, the second threaded area being machined over a portion of the first threaded area proximate the distal end, the first nut having internal threads complementary to the second thread direction of the second threaded area such that the first nut can be threaded over the second threaded area to reach the first threaded area.

2. The locking nut system as in claim 1, wherein the threaded member is a bolt, a rod, an axle, or a screw.

3. The locking nut system as in claim 1, wherein the first thread direction is a right-hand direction and the second thread direction includes a left-hand direction, or the first thread direction is a left-hand direction and the second thread direction includes a right-hand direction.

4. The locking nut system as in claim 1, further comprising the second nut, the second nut having internal threads complementary to the second thread direction of the second threaded area such that the second nut can be threaded over the second threaded area.

5. A locking nut system, comprising:
a threaded member having a first threaded area defining a first thread direction and a second threaded area having a second thread direction different from the first thread direction but not conflicting therewith;
a plurality of crests formed along the first and second threaded areas, a constant pitch being defined between crests;
a first nut having a first set of internal threads complementary to the first thread direction of the first threaded area, the second threaded area configured to permit passage of the first nut to the first threaded area;
a second nut having a second set of internal threads complementary to the second thread direction of the second threaded area;
wherein the threaded member is configured for insertion through a workpiece to receive the first nut over the second threaded area and onto the first threaded area to secure the first nut against the workpiece and is further configured to receive the second nut over the second threaded area to secure the first nut; and
wherein the second threaded area is overlaid on a portion of the first threaded area such that the second threaded area retains about 75% to about 87% of material from the portion of the first threaded area and permits the first nut to be threaded over both the first and second threaded areas.

6. The locking nut system as in claim 5, wherein the threaded member is a bolt or a screw.

7. The locking nut system as in claim 5, the first thread direction is a right-hand direction and the second thread direction includes a left-hand direction.

8. The locking nut system as in claim 5, the first thread direction is a left-hand direction and the second thread direction includes a right-hand direction.

9. The locking nut system as in claim 5, wherein the second nut is configured to be threaded over the second threaded area but cannot be threaded onto the first threaded area.

10. A method of manufacturing a locking nut system, comprising:
providing a member for machining;
machining a first threaded area with a first thread direction;
machining a second threaded area over a portion of the first threaded area, the second threaded area defining a second thread direction opposite the first thread direction, the second threaded area having both first and second thread directions; and
forming a plurality of thread crests along the first and second threaded areas with a constant pitch between the thread crests;
wherein, when the second threaded area is machined over a portion of the first threaded area, the second threaded area retains from about 75% to about 87% of material from the portion of the first threaded area, and a nut having internal threads complementary to the first threaded area can be threaded along the second threaded area and the first threaded area.

11. The method as in claim 10, further comprising:
providing a first nut having a first set of internal threads complementary to the first thread direction of the first threaded area; and
providing a second nut having a second set of internal threads complementary to the second thread direction of the second threaded area.

12. The method as in claim 11, further comprising inserting the threaded member through a workpiece to receive the first nut over the second threaded area and onto the first threaded area to secure the first nut against the workpiece, and further configured to receive the second nut over the second threaded area to secure the first nut.

13. The method as in claim 10, wherein the first nut is configured for connection over the first and second threaded areas, and the second nut is configured for connection over the second threaded area.

14. The method as in claim 10, wherein, when the member is inserted in a workpiece and secured by at least a first nut having internal threads complementary to the first thread direction and a second nut having internal threads complementary to the second thread direction and a vibration acts upon the member and the first and second nuts, the second nut is configured to oppose the vibration to secure the first nut to the workpiece.

15. The method as in claim 10, wherein, when the member is inserted in a workpiece and secured by at least a first nut having internal threads complementary to the first thread direction and a second nut having internal threads complementary to the second thread direction and a loosening vibration acts upon the first nut, the second nut is unaffected by the vibration thereby securing the first nut to the workpiece.

16. A locking nut system, comprising:
a threaded member having a proximal end, a body, and a distal end, the body including a first threaded area having a first thread direction and a second threaded area having a second thread direction differing from the first thread direction but not incompatible therewith, the first and second threaded areas defining a plurality of crests with a constant pitch between crests, wherein the threaded member is configured for insertion through a workpiece to receive a first nut along the second threaded area and onto the first threaded area to secure the workpiece between the proximal end and the distal end, and further configured to receive a second nut onto the second threaded area, the second nut being configured to stabilize the first nut against vibrations, wherein, after machining the second threaded area over the portion of the first threaded area, the second threaded area retains at least 50% of material from the portion of the first threaded area such that the first nut can be threaded over the second threaded area to reach the first threaded area.

17. A locking nut system, comprising:
a threaded member having a proximal end, a body, and a distal end, the body including a first threaded area having a first thread direction and a second threaded area having a second thread direction differing from the first thread direction but not incompatible therewith, the first and second threaded areas defining a plurality of crests with a constant pitch between crests, wherein the threaded member is configured for insertion through a workpiece to receive a first nut along the second threaded area and onto the first threaded area to secure the workpiece between the proximal end and the distal end, and further configured to receive a second nut onto the second threaded area, the second nut being configured to stabilize the first nut against vibrations, wherein, after machining the second threaded area over the portion of the first threaded area, the second threaded area retains about 75% to about 87% of material from the portion of the first threaded area, and the first nut can be threaded over the second threaded area to reach the first threaded area.

* * * * *